March 2, 1954
C. R. JOHNSON
2,671,131
TELEVISION SYSTEM FOR REMOTE TIME INDICATION
Filed Jan. 25, 1951
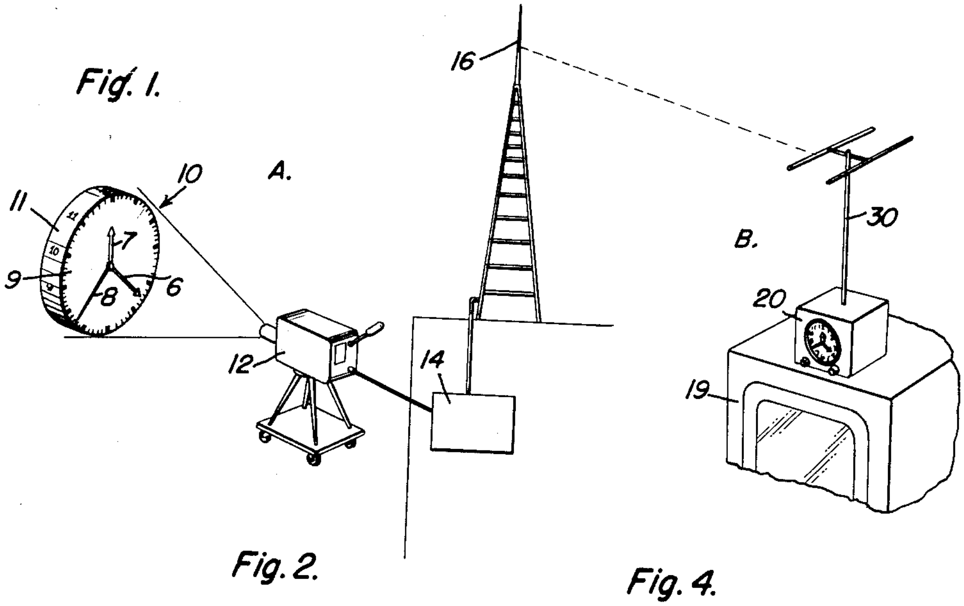
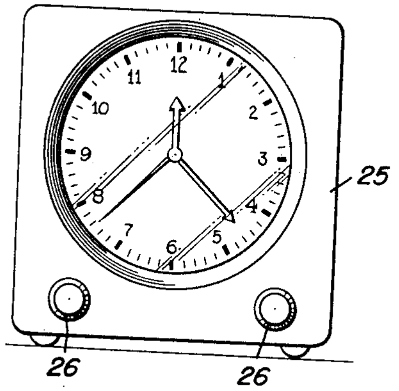
Fig. 2.
Fig. 4.
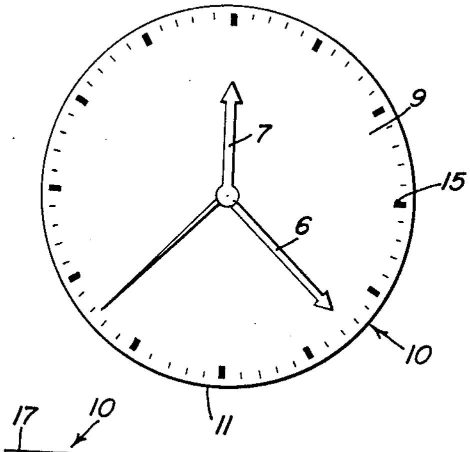
Fig. 3.
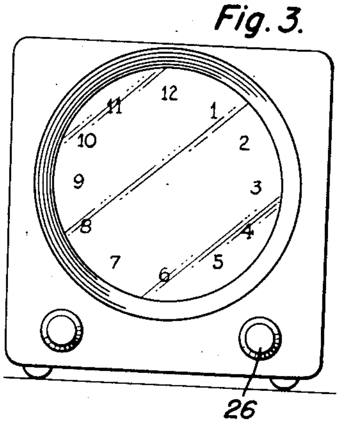
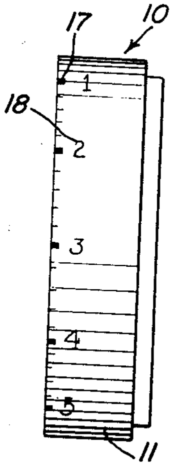
Fig. 5.
Clarence R. Johnson
INVENTOR.
BY Clarence A. O'Brien and Harvey B. Jacobson
Attorneys Patented Mar. 2, 1954

2,671,131

UNITED STATES PATENT OFFICE 2,671,131

TELEVISION SYSTEM FOR REMOTE TIME INDICATION

Clarence R. Johnson, Gary, Ind.

Application January 25, 1951, Serial No. 207,686

1 Claim. (Cl. 178—6)

This invention relates to time indicating systems and it has for its main object to provide a time indicator which is operable by means of television signals and which forms part of a system in which the indication is furnished partly by the televised image of a variable indicator and partly by stationary and fixed indications, the system being so arranged that these two indications always fit into each other and cooperate to form a complete indication of the customary type. The system according to the invention therefore comprises a television transmitter providing essentially the movable or variable indication, either alone or in combination with a part of the fixed time indication and in a clock like receiver which in its turn is provided with all stationary indications or with those stationary indications which supplement the indications furnished by the transmitter and onto which the image transmitted is so projected that the image together with the fixed indications furnishes a complete time indication. The receiver thus forms the clock of an appearance which may be selected individually, the indicating system of which is produced by a combination of indications some of which are transmitted by high frequency television signals and others being permanent indications provided on the receiver.

Automatic time indicating signals for radio or television systems have been proposed, most of them being of the acoustical type. Moreover a time indication for television systems has also been used in which the dial of a clock set for the correct time is displayed as part of the picture received. This type of signal, while informing the subscriber periodically of the correct time is however unsatisfactory for the majority of the subscribers as it is necessary to listen to a full program in order to be able to profit from such a time indication. It will therefore be clear that the time indication on fixed hours, whether supplied by sound or by a picture of a clock is no equivalent or substitute for a clock and can only be used for the purpose of keeping other timepieces on the correct time.

The present invention has for its object to supply a full equivalent of a mechanical or electrical clock which may be consulted at any time by the person using the system and apparatus and which is either permanently operative as a timepiece or which may be made operative at anytime upon a simple manipulation. The invention therefore consists in a television system in which either the image of the pointer system of a master clock or the image of the pointer system together with a graduation is transmitted through a separate television channel continuously to a special television receiver picking up the image of the master clock in such a position that it may fit into the stationary indications provided on said receiver, those elements of the complete indication which have been furnished by the master clock forming the variable time indicating element to be used in conjunction with the stable or stationary elements. The televised image of the pointer system, with or without a graduation surrounding it, therefore cooperates with the fixed indication system on the receiver screen and the two indications combined furnish a full time indication which is given in the usual manner presenting the picture of a clock to which the subscriber is accustomed.

The above described system is preferable to all other indication systems, because it gives the visual image which is permanently displayed or which can be displayed at a moment's notice by turning a knob and which presents the picture within a frame or housing of the subscriber's choice with indications of the subscriber's choice, both being fitted to the taste and to the type of furniture in the room in which the clock is used.

Moreover, when compared with mechanical or electrical clocks a particularly pleasing appearance is obtainable on account of the luminous appearance of the dial of the clock. Further, the subscriber has no manipulation to perform, such as winding, readjusting or the like except the turning of a knob which makes the receiver operative. According to the invention, moreover, a special channel with a special frequency band is used and therefore the frequency adjustment may be a fixed one and may only be provided with means for the readjustment in the event of slight deviations. The ordinary manipulation necessary to make the clock operative therefore reduces itself to the switching on and off of the receiver if the latter is not permanently kept in operation.

It will thus be seen that the system according to the invention has a series of advantages over other remote time indicating systems as it permits the use of an indicator with an individually selected appearance which is distinguished from apparatus used by others in the same way in which clocks are distinguished and which nevertheless provides a public indication of the time of greatest precision, thus combining the advantage of a public time indicating system with those of a private and individualized timepiece which has the character of a piece of furniture selected according to taste and blending in with the surroundings.

This system has also the technical advantage that an extreme simplification of the transmission means is obtainable as the transmitter can operate with a simplified scanning means, with a relatively small number of picture points on each line, and with a relatively small number of lines while the sound producing and reproducing apparatus can be completely dispensed with.

Further objects of the invention and further advantages will be apparent from the following detailed specification in which an embodiment of the invention is described by way of example. This embodiment is also illustrated in the accompanying drawings, but it is to be understood that the embodiment shown and described has been selected in order to explain the principle of the invention and the best mode of applying said principle. The specification and drawings do not intend to describe and to show all the possible applications of the principle of the invention and a departure from the embodiment illustrated and described is therefore not necessarily a departure from the principle of the invention.

In the drawings:

Figure 1 is a diagrammatic representation of the system illustrating in a purely schematic fashion the transmitter and a receiver.

Figures 2 and 3 are elevational views of a receiver, Figure 2 illustrating the receiver during the reception of the signal and Figure 3 illustrating the same receiver when no signal is received.

Figure 4 is an elevational frontal view of the master clock used in the transmitter station.

Figure 5 is an elevational side view of the master clock which is shown in Figure 4.

As has been explained above the essence of the invention consists in providing a time indication, one part of which is transmitted over a special television channel and comprises the image of a pointer system which has been picked up from a master clock and has been projected on a television screen which is provided with fixed clock dial indications completing the televised image.

This arrangement permits to use a special simplified clock like receiver and a special simplified transmitter, as the sound transmission system can be eliminated and as the number of lines to be scanned and the number of picture points on each line can be markedly reduced if merely the pointer system is transmitted. To obtain highest precision and to avoid all adjustments it may be preferable to transmit the graduation system of the master clock together with the pointer system thus securing a reading of the desired accuracy.

Referring now to the drawings the master clock (Figures 4 and 5) in the transmitter station consists of a pointer system 6, 7, 8 which moves in front of a dial system in the form of a drum. The dial of the master clock therefore consists of a flat circular dial surface 9 and an adjoining cylindrical or somewhat conical rim or wall 11. The flat dial surface 9 contains the graduations 15 along its edge adjoining the cylindrical or conical rim or wall and all the marks provided along the edge or those marks which correspond to the hours for instance, have a continuation 17 on the other side of the edge and are therefore also visible on the cylindrical or conical rim or wall portion 11 of the dial. This portion carries the figures 18 or other hour indicating marks. The cylindrical or conical portion 11 may therefore be inspected by and is permanently visible to the operator of the television camera but the marks on this cylindrical or conical portion are not included in the picture made by the camera. If a conical rim portion is used the camera will nevertheless not show the rim, provided that the apex of the conical portion is at a distance from the flat surface of the dial which is greater than the distance of the clock from the focus of the television camera.

The pointer system preferably comprises three pointers, namely the conventional hour and minute hands 6 and 7 and a second indicating hand.

The system itself is diagrammatically shown in Figure 1. It comprises a transmitter station A in which the master clock 10, which has been above described, is mounted in front of a television camera 12 which is connected with a radio transmitter 14 radiating its signals through the aerial 16. In the receiver station B the signals radiated from the aerial 16 are received by the antenna 30 which is connected with the customary television receiving apparatus 19 and with a small clock receiver 20. This receiver contains a circular screen 22 (Figures 2 and 3) provided on the end surface of a cathode ray tube of conventional construction. Preferably on the outside of the tube a set of hour indicating numerals or figures 21 are applied by painting, printing, etching or the like. The painted, printed or etched figures may be opaque so that black figures are shown on the luminous screen or they may be colored or semi-transparent in order to produce a color or light effect. The numerals or figures may also be applied to the screen when manufacturing the tube, using a non-fluorescent material or a material showing a different color or degree of luminosity during fluorescence. The dial with the figures when not in operation is shown in Figure 3.

When the receiver is operated the screen shows a picture of the pointers and of the graduation along the edge and the figures or numerals fit themselves into the system to make a complete dial which is readable by everybody.

The receiver may be housed in a suitable casing 25 provided with one or more control knobs 26 and the figures in the dial may preferably be designed to fit the style or type of casing which has been adopted so that the receiver looks very much like a clock the style or appearance of which has been fitted to the surroundings. The appearance of the clock forming the receiver in operation is rendered more pleasing by the luminosity of the dial.

It will be obvious that non-essential changes in the system will not in any way affect the manner in which the principle is carried into effect and will not form a departure from the invention as defined by the annexed claim.

Having described the invention, what is claimed as new is:

A time indicating system comprising a television transmitter adapted to transmit television images on a predetermined frequency channel, a master clock provided with a dial, a pointer system and a system of graduation marks along the edge of said dial, means for producing and for radiating a television image of the dial and pointer system of the master clock and a television receiver with a circular fluorescent screen, provided with permanent clock dial figures arranged along a circle near the screen margin to cooperate with the image of the pointer of the master clock and of the graduations on said master clock, appearing in the central portion of said fluorescent screen and along the margin of the screen respectively, when the receiver is operative.

CLARENCE R. JOHNSON.

References Cited in the file of this patent

UNITED STATES PATENTS

| Number | Name | Date |
|---|---|---|
| 2,538,065 | Wallace | Jan. 16, 1951 |

FOREIGN PATENTS

| Number | Country | Date |
|---|---|---|
| 481,574 | Great Britain | May 22, 1936 |